A. P. BRUSH.
AUTOMOBILE STEERING MECHANISM.
APPLICATION FILED NOV. 27, 1916.
1,275,839.
Patented Aug. 13, 1918.
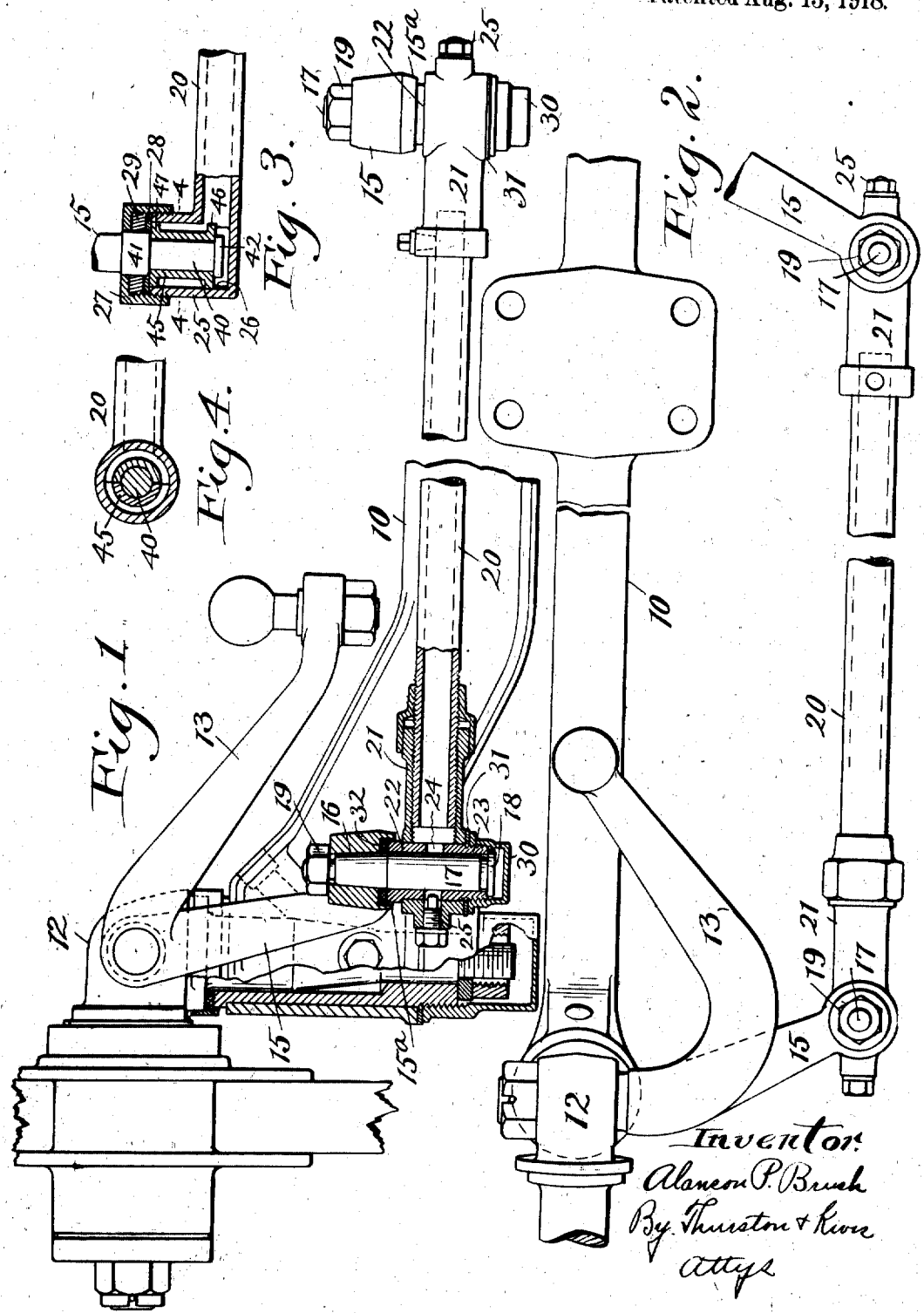

UNITED STATES PATENT OFFICE.

ALANSON P. BRUSH, OF DETROIT, MICHIGAN.

AUTOMOBILE STEERING MECHANISM.

1,275,839.  Specification of Letters Patent.  Patented Aug. 13, 1918.

Application filed November 27, 1916. Serial No. 133,543.

*To all whom it may concern:*

Be it known that I, ALANSON P. BRUSH, a citizen of the United States, residing at Detroit, in the county of Wayne and State of Michigan, have invented a certain new and useful Improvement in Automobile Steering Mechanism, of which the following is a full, clear, and exact description.

This invention relates to certain improved means for effectively pivoting the two arms of the steering knuckles of an automobile to the cross tie rod with which said arms are always pivoted in order to secure the proper sequental turning of said two steering knuckles.

The invention relates to means, which include the utilization of the cross tie rod as a reservoir for containing oil, by which the two pivotal joints referred to are kept lubricated; and also to the construction and combination of parts through which each steering arm is pivotally connected with the cross tie rod.

In so far as relates to the lubricating means, this application is a continuation in part of my prior application Serial No. 874,606, filed November 30th, 1914, because said prior application does not claim the said lubricating means, but does show and describe that embodiment thereof which is shown in the drawing of this application in Figs. 3 and 4 thereof.

The invention consists in the construction and combination of parts shown in the drawing and hereinafter described and pointed out definitely in the appended claims.

In the drawing, Figure 1 is a front elevation partly sectioned of so much of a front axle and its associated mechanism as is necessary to disclose the present invention; Fig. 2 is a plan view of the parts shown in Fig. 1. Fig. 3 is a vertical section of a connection between the end of the cross tie rod and a steering arm, which differs from that shown in Figs. 1 and 2, but which embodies the same lubricating means; and Fig. 4 is a horizontal section on the plane of line 4—4 on Fig. 3.

Referring to the parts by reference characters, and particularly to those parts as shown in Figs. 1 and 2, 10 represents the front axle which is of the usual construction; and 12 represents one of the steering knuckles which is pivoted on a vertical pivot to the end of the axle. It will be understood that another similar steering knuckle will be similarly pivoted to the opposite end of the axle. Each of these steering knuckles has an arm 15, and these two arms are pivoted on a vertical axis to a transverse tie rod 20, so that when one of the steering knuckles is turned upon its axis the other will be simultaneously turned. One of the steering knuckles is provided with an arm 13 by which it may be turned by any suitable mechanism, such as ordinarily employed for the purpose.

To the extent above described the steering mechanism is or may be of any suitable construction. In the construction shown in Figs. 1 and 2 the arm 15 is provided adjacent its end with a tapered vertical hole 16 which receives the tapered upper end of the pivot stud 17 which pivot stud has at its lower end the outwardly projecting annular flange 18. A nut 19 which screws onto the projecting upper end of the stud 17 draws and holds it tightly in the hole in the arm 15. The cross rod 20 is tubular, and each end thereof is screwed into a sleeve 21, the outer end of which has a vertical cylindrical hole through it in which two cylindrical bushings 22 and 23 are tightly and rigidly fixed. The space between the adjacent ends of these bushings forms an annular oil groove 24 around the stud 17 when the parts are assembled, and this annular oil groove is in open communication with the interior of the rod 20 and sleeve 21.

A hole, which is normally closed by the plug 25, affords means through which oil may be introduced into the groove 24, and thence into the tubular cross rod 20, which thereby will come to serve as an oil containing reservoir. A cap 30 is screwed onto the projecting lower end of the bushing 23, and therefore will serve to prevent the escape of any of said oil which may pass down between the stud 17 and said bushing 23.

When the parts are assembled in proper relation to one another as shown the lower end of the bushing 23 will rest upon the flange 18, and therefore the end of the cross rod 20 which carries said bushing will be supported on said stud. There will preferably be a packing washer 31 interposed between the upper end of the cap 30 and the lower end of the part of the member 21 in which the bushing 23 is secured. There will also be a packing ring 32 which may be made of felt, interposed between the upper projecting end of the bushing 22 and the lower face of the end of the arm 15, said packing ring being preferably confined by an annular flange 15ª formed on said arm 15.

It is to be understood that the above described connection between the cross rod 20 and the arm 15 will be employed at each end of said rod to connect it to the arm of the adjacent knuckle. It is quite evident that the construction is not expensive, and that it may be easily assembled. To assemble the parts the cap 30 is of course removed, and then the stud 17 is passed upward through the two bushings 22, 23, into the hole 16 in the arm 15, and then the nut 19 is screwed or securely fastened to said stud in said arm. After this the cap 30 is screwed on and the parts are in readiness to be supplied with oil and to operate in the usual manner.

Fig. 3 shows in vertical section a different specific embodiment of the lubricating means herein claimed, or perhaps, more exactly, substantially the same lubricating means, but in association with a different specific joint between the cross tie rod and the steering arm of one of the knuckles; and Fig. 4 is a horizontal section in the plane of line 4—4 on Fig. 3.

In the construction shown in Figs. 3 and 4 the arm 15 is bent downward at its end forming the vertical downwardly extended pivot stud 40. The cross tie rod 20 is provided at its end with an upwardly extended sleeve 25 which is open at its upper end.

This stud 40 is rotatable within a split bushing 45 which is fitted within the sleeve 25 resting upon an annular shoulder 26 therein against which the bushing is held by a cap nut 27 that is screwed upon the upper end of the sleeve 25, and down against two washers 28, 29. These embrace the stud 40. One of the washers may be of metal and the other one of felt. The lower felt washer bears upon the top of the split bushing and the top of the sleeve 25 and closely embraces the stud 40, thereby forming an oil tight joint. The stud 40 is formed with two annular shoulders 41, 42, which respectively engage the upper and lower ends of the split bushing. The split bushing has outwardly extended flanges 46, 47, adjacent its ends. It is evident, therefore, that there is formed around and below said bushing a chamber adapted to contain oil, and that this chamber is in open communication with the hollow interior of the cross tie rod which may therefore serve as an oil reservoir which keeps this chamber supplied with the necessary oil for lubricating the engaging surfaces of the stud and bushing.

Having described my invention, I claim:

1. In an automobile, the combination of a front axle, a steering knuckle pivoted to each end thereof on a vertical axis and provided with a steering arm, a cross tie rod for connecting said steering arms,—which cross tie rod has adjacent each end a vertical sleeve which is closed at its lower end, a bearing stud which is rigid with and projects from each steering arm downward into the bearing sleeve in the adjacent end of the cross tie rod and is rotatably mounted therein, and each stud being provided within the vertical sleeve into which it projects with an annular flange, and each sleeve being provided with an annular shoulder which rests upon said flange.

2. In an automobile, the combination of a front axle, a steering knuckle pivoted to each end thereof on a vertical axis and provided with a steering arm, a hollow cross tie rod for connecting said steering arms,—which cross tie rod has adjacent each end a vertical sleeve which is closed at its lower end and which communicates with the hollow interior of the cross tie rod, a bearing stud which is rigid with and projects from each steering arm downward into the bearing sleeve in the adjacent end of the cross tie rod and is rotatively mounted therein, and means to hold the studs in said bearing sleeves.

3. In an automobile, the combination of the two steering knuckles each having an arm, a pivot stud fixed to and projecting down from each of said arms, a tubular cross rod having vertically disposed bearing sleeves at its ends which sleeves embrace and serve as bearings for said studs, an annular flange on the lower end of each stud upon which said bearing sleeves are supported, and a cap removably fixed to each end of said cross rod closing the lower end of the associated bearing sleeve and there being an oil passage leading from the interior of each bearing sleeve to the interior of said cross rod.

4. The combination with an arm fixed to the steering knuckle of an automobile, of a stud removably fixed to said arm and extending downward therefrom and having an annular flange at its lower end, a tubular cross rod, two vertical bushings fixed in the end of said cross rod and rotatably mounted upon said stud with the lower end of the lower bushing resting upon the flange on said stud, and a cap removably fixed to the cross rod and covering and inclosing the projecting lower end of said stud, and there being an annular groove around said stud between said two bushings which is in communication with the hollow interior of the tubular cross rod.

In testimony whereof I hereunto affix my signature in the presence of two witnesses.

ALANSON P. BRUSH.

Witnesses:
E. L. THURSTON,
L. I. PORTER.